United States Patent
Mula et al.

(10) Patent No.: US 10,592,240 B1
(45) Date of Patent: Mar. 17, 2020

(54) SCALABLE RANDOM ARBITER

(71) Applicant: MELLANOX TECHNOLOGIES TLV LTD., Raanana (IL)

(72) Inventors: Liron Mula, Ramat Gan (IL); Gil Levy, Hod Hasharon (IL)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 0 days.

(21) Appl. No.: 16/159,736

(22) Filed: Oct. 15, 2018

(51) Int. Cl.
*G06F 9/30* (2018.01)
*H04L 12/937* (2013.01)
*H04L 12/933* (2013.01)
*G06F 13/364* (2006.01)

(52) U.S. Cl.
CPC ...... *G06F 9/30036* (2013.01); *G06F 9/30032* (2013.01); *H04L 49/1515* (2013.01); *H04L 49/254* (2013.01); *G06F 13/364* (2013.01)

(58) Field of Classification Search
CPC ...... G06F 13/362; G06F 13/364; G06F 13/14; G06F 13/1605; G06F 13/36; G06F 13/4031
USPC .......................................... 710/113, 240–244
See application file for complete search history.

(56) References Cited

U.S. PATENT DOCUMENTS

| | | | | |
|---|---|---|---|---|
| 6,760,739 B2* | 7/2004 | Takahashi | ................. | G06F 7/58 708/250 |
| 6,807,594 B1* | 10/2004 | Sindhu | ................... | H04L 47/10 370/395.31 |
| 7,539,199 B2* | 5/2009 | Shrimali | ............... | H04L 49/254 370/395.42 |
| 8,089,959 B2* | 1/2012 | Szymanski | ......... | H04L 12/5601 370/359 |
| 9,660,940 B2* | 5/2017 | Anand | ................ | H04L 49/1515 |
| 9,872,068 B2* | 1/2018 | Aubineau | .......... | H04N 21/4408 |
| 2014/0177470 A1* | 6/2014 | Roitshtein | ............. | H04L 41/083 370/254 |

OTHER PUBLICATIONS

Butler et al., "Hardware Index to Permutation Converter", IEEE 26th International Parallel and Distributed Processing Symposium Workshops & PhD Forum, pp. 1-8, May 21-25, 2012.

(Continued)

*Primary Examiner* — Brian T Misiura
(74) *Attorney, Agent, or Firm* — Kligler & Associates Patent Attorneys Ltd (57) ABSTRACT

An electronic apparatus includes a permutation circuit and an arbitration circuit. The permutation circuit is configured to apply to an input vector a permutation selected from a plurality of predefined permutations in response to a control word. The arbitration circuit is configured to receive a vector of requests for a resource, to instruct the permutation circuit to apply a randomly-selected permutation to the vector of requests, by configuring the permutation circuit with a corresponding randomly-selected control word so as to produce a permuted vector, to select an element of the permuted vector, to apply to the permuted vector an inverse of the randomly-selected permutation so as to produce an inversely-permuted vector, to identify an element of the inversely-permuted vector to which the selected element of the permuted vector is mapped, and to assign the resource to a client corresponding to the identified element of the inversely-permuted vector.

19 Claims, 5 Drawing Sheets

(56) References Cited

OTHER PUBLICATIONS

Huang, et al., "A Benes Packet Network", Institute for Interdisciplinary Information Sciences (IIIS), Tsinghua University, EECS © UC Berkeley, pp. 1-50, Jun. 22, 2012.

Gelman, et al., "The Benes network is q(q-1)/2n almost q-set-wise independent", Tel-Aviv University, pp. 1-12, Oct. 13, 2014.

"Clos network", downloaded from https://web.archive.org/web/20180518153334/https://en.wikipedia.org/wiki/Clos_network, pp. 1-5, Oct. 15, 2017.

* cited by examiner

SCALABLE RANDOM ARBITER

FIELD OF THE INVENTION

The present invention relates generally to digital hardware design, and particularly to methods and systems for random arbitration.

BACKGROUND OF THE INVENTION

Various arbitration schemes, for use is allocating a limited resource to multiple clients, are known in the art. Some arbitration schemes introduce some randomness in the arbitration process, and are therefore referred to as "random arbitration." Known random arbitration schemes, however, tend to be computationally-intensive, and therefore have limited scalability. Moreover, random arbitration are often problematic in terms of maintaining fairness and preventing starvation.

SUMMARY OF THE INVENTION

An embodiment of the present invention that is described herein provides an electronic apparatus including a permutation circuit and an arbitration circuit. The permutation circuit is configured to apply to an input vector a permutation selected from a plurality of predefined permutations in response to a control word. The arbitration circuit is configured to receive a vector of requests for a resource, to instruct the permutation circuit to apply a randomly-selected permutation to the vector of requests, by configuring the permutation circuit with a corresponding randomly-selected control word so as to produce a permuted vector, to select an element of the permuted vector, to apply to the permuted vector an inverse of the randomly-selected permutation so as to produce an inversely-permuted vector, to identify an element of the inversely-permuted vector to which the selected element of the permuted vector is mapped, and to assign the resource to a client corresponding to the identified element of the inversely-permuted vector.

In some embodiments, the permutation circuit includes a plurality of multiplexers, which are connected in a predefined topology and are configured by the control word. In an example embodiment, the permutation circuit includes a plurality of two-by-two cross-bar multiplexers connected to form one or more sections of Benes networks.

In some embodiments, the permutation circuit includes a plurality of single-permutation blocks, each single-permutation block controlled by a respective bit of the control word that determines whether the single-permutation block applies a fixed respective permutation or applies no permutation. In an embodiment, the single-permutation blocks are arranged in multiple layers, each layer including two or more single-permutation blocks that are configured to permute two or more respective sub-vectors, and the permutation circuit further includes one or more constant-permutation blocks that are configured to apply a fixed permutation between the layers.

In a disclosed embodiment, the arbitration circuit is configured to select the element of the permuted vector, by choosing the first element in the permuted vector that indicates an active request for the resource. In an embodiment, the arbitration circuit is configured to: before applying the inverse of the randomly-selected permutation to the permuted vector, null the elements of the permuted vector other than the selected element, and, identify the element of the inversely-permuted vector to which the selected element of the permuted vector is mapped, by identifying the element of the inversely-permuted vector that is not nulled.

There is additionally provided, in accordance with an embodiment of the present invention, a method for arbitration, including receiving a vector of requests for a resource, and applying a randomly-selected permutation to the vector of requests, so as to produce a permuted vector. An element of the permuted vector is selected, and an inverse of the randomly-selected permutation is applied to the permuted vector, so as to produce an inversely-permuted vector. An element of the inversely-permuted vector, to which the selected element of the permuted vector is mapped, is identified. The resource is assigned to a client corresponding to the identified element of the inversely-permuted vector.

There is also provided, in accordance with an embodiment of the present invention, an electronic apparatus including multiple clients, a hardware resource, and an arbiter. The arbiter is configured to receive a vector of requests for a resource, to apply a randomly-selected permutation to the vector of requests so as to produce a permuted vector, to select an element of the permuted vector, to apply to the permuted vector an inverse of the randomly-selected permutation so as to produce an inversely-permuted vector, to identify an element of the inversely-permuted vector to which the selected element of the permuted vector is mapped, and to assign the resource to a request corresponding to the identified element of the inversely-permuted vector.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and apparatus for random arbitration. In an example embodiment, the disclosed techniques are used in a network element, e.g., an Infiniband or Ethernet network switch, in which multiple hardware units compete for packet-processing resources. Generally, however, the arbitration schemes described herein can be used in any other suitable system or application that involves multiple clients that access a resource.

In some embodiments of the present invention, a random arbiter is configured to arbitrate simultaneous requests for a resource, received from multiple clients. Without loss of generality, the requests to be arbitrated in a given arbitration cycle are represented as a request vector. The number of elements in the request vector is the total number of clients (including both clients that issued requests and clients that did not). In other words, each element of the request vector corresponds to a respective client. If the $k^{th}$ client has issued a request to the arbiter, the $k^{th}$ element of the request vector is set to "1", otherwise the $k^{th}$ element is set to "0".

One possible way to arbitrate among the requests is to select a position in the request vector in some random manner, and then select the winning request based on the randomly-selected position (e.g., select the next-higher element of the vector that is set to "1"). Such a scheme, however, is prone to unfairness, and its performance depends significantly on the correlation among the clients (the distribution of "1"s in the request vector). For example, if the request vector contains a sequence of consecutive "1"s, such a naïve scheme will favor the client corresponding to the first "1" in the sequence, at the expense of other clients.

In some embodiments of the present invention, the random arbiter ensures fairness by first applying a randomly-selected permutation to the request vector, and then selecting the winner based on a position in the permuted vector. For example, the winner may be selected as the first element of the permuted vector that is set to "1". In order to identify the winning client, the arbiter marks this element, then applies an inverse of the randomly-selected permutation, and then identifies the index of the inversely-permuted vector to which the marked element of the permuted vector is mapped. This index corresponds to the winning request, i.e., the winning client. The arbiter serves the resource to this client.

In an example implementation, the arbiter marks the desired element of the permuted vector (e.g., the first element of the permuted vector that is set to "1") by nulling all the other elements. Following the inverse permutation, the inversely-permuted vector will contain a single "1" at the position corresponding to the winning client.

Over time, the technique of selecting the winning requests in the randomly-permuted request vectors, instead of in the request vectors themselves, is highly effective in ensuring fairness. Consider, for example, the above-described scenario in which correlation among clients causes sequences of consecutive "1"s in the request vectors to occur with high likelihood. When using permutations that vary randomly from one arbitration cycle to another, the fairness of the arbitration is not impacted by this correlation.

In practice, the performance of the above arbitration scheme depends to a large extent on the level of randomness in selecting the permutations of the request vector. Several example implementations of arbiters that carry out the disclosed scheme are described below. The embodiments described herein provide a high degree of randomness in selecting random permutations, and therefore ensure a high degree of fairness among the clients.

At the same time, the disclosed embodiments lend themselves to efficient implementation in hardware. In the disclosed permutation circuits the number of multiplexers grows much more slowly with the number of clients, in comparison with conventional permutation generation. This property reduces the circuit size and power consumption significantly. As such, the disclosed arbiters are suitable for use in systems having large numbers of clients that issue requests at a high rate, e.g., in large scale network switches having hundreds of ports.

System Description

Figure 1:
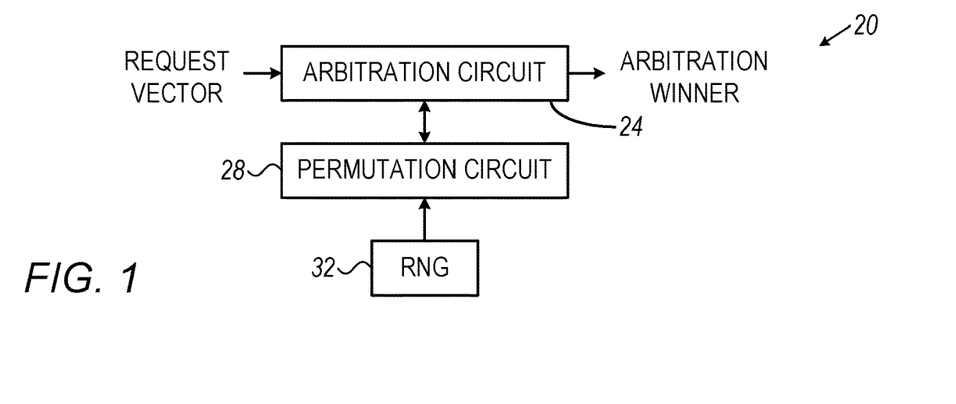
FIG. 1 is a block diagram that schematically illustrates a random arbiter, in accordance with an embodiment of the present invention.

FIG. 1 is a block diagram that schematically illustrates a random arbiter 20, in accordance with an embodiment of the present invention. In the present example arbiter 20 comprises an arbitration circuit 24, a permutation circuit 28 and a Random-Number Generator (RNG) 32.

Figure 7:
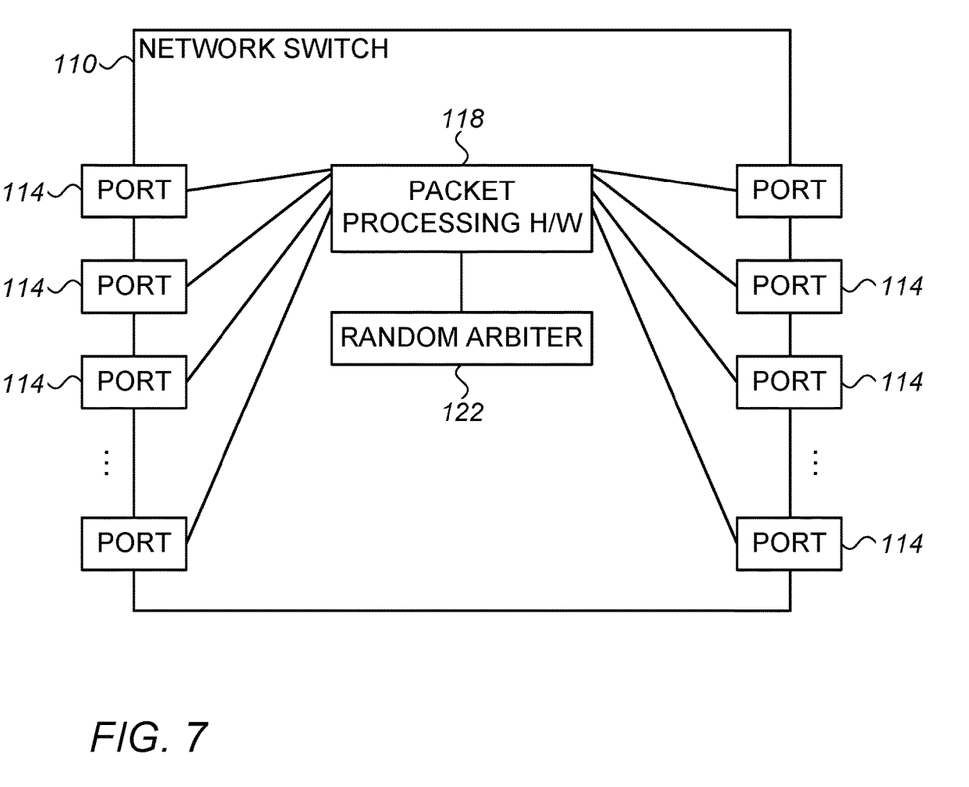
FIG. 7 is a block diagram that schematically illustrates network switch comprising a random arbiter, in accordance with an embodiment of the present invention.

In an example embodiment, arbiter 20 is part of a network switch, the clients are ports of the switch, and the resource comprises some packet-processing hardware that the ports send packets to. An example switch of this sort is shown in FIG. 7 below. Alternatively, arbiter 20 may be part of any other suitable system, in which any other suitable clients request access to any other suitable resource.

In a given arbitration cycle, arbitration circuit 24 receives a request vector that specifies which of the clients have issued requests to access the resource. For example, for a total of eight clients denoted C1 . . . C8, the request vector $\{1,1,1,1,0,0,1,1\}$ specifies that clients C1, C2, C3, C4, C7 and C8 requested the resource. Arbitration circuit 24 chooses one of the requesting clients as the winner, and assigns the resource to this winner. This process is typically repeated continuously, one arbitration cycle after another.

It is noted that the disclosed techniques are in no way limited to the specific representation of client requests as a vector of "1"s and "0" s. In alternative embodiments, the arbiter may receive requests from clients in any other suitable format or representation. The vector representation is used herein purely by way of example, for the sake of conceptual clarity.

For performing arbitration in a fair manner, typically while avoiding starvation, arbitration circuit 24 performs random arbitration assisted by permutation circuit 28 and RNG 32. In the present context, the term "fair" means that, on average, arbiter 20 does not favor any of the clients over any other client in granting access to the resource. The term "avoid starvation" means that no client is declined access to the resource for more than a predefined (and typically short) time period.

Typically, in each arbitration cycle, RNG 32 generates a random control word, i.e., a control word whose bit values are set to "1" or "0" at random. Permutation circuit 28 derives a permutation from the randomly-selected control word, and applies this permutation to the request vector. In the present context, the term "permutation" means a one-to-one mapping that maps each bit position in the request vector ("input vector") to a respective bit position in the permuted vector ("output vector"). Put in another way, each permutation comprises a respective reordering of the bits of the request vector. For N clients, the total number of permutations is the factorial of N. Typically, permutation circuit 28 is also configured to apply the inverse of the randomly-selected permutation.

Since the control word generated by RNG 32 is random, the permutation generated by circuit 28 is random, as well. In the present context, a pseudo-randomly selected control word is also considered a type of randomly-selected control word (and therefore a pseudo-randomly selected permutation is considered a type of randomly-selected permutation). As will be described in detail below, in some embodiments permutation circuit 28 applies the permutation using a plurality of multiplexers, whose multiplexing configuration is set by the bits of the randomly-selected control word.

Figure 2:
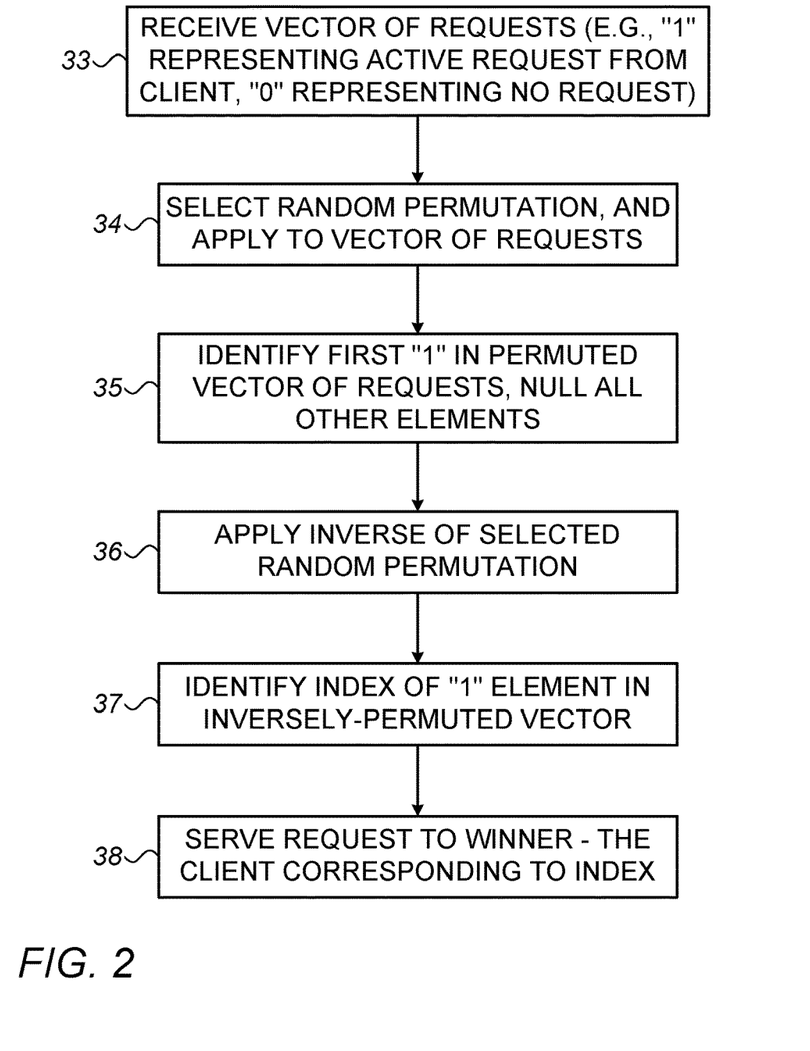
FIG. 2 is a flow chart that schematically illustrates a method for random arbitration, in accordance with an embodiment of the present invention.

FIG. 2 is a flow chart that schematically illustrates a method for random arbitration carried out by arbiter 20 of FIG. 1, in accordance with an embodiment of the present invention. The method begins with arbitration circuit 24 receiving a request vector, at an arbitration requesting step 33.

At a random permutation step 34, RNG 32 generates a random control word, permutation circuit 28 selects a permutation based on the random control word and applies the randomly-selected permutation to the request vector. The resulting vector is referred to herein as "permuted vector."

At a winner selection step 35, arbitration circuit 28 finds the first "1" in the permuted vector (i.e., the "1" having the smallest element index in the permuted vector). Arbitration circuit 28 retains this element set to "1", and nulls all the other elements of the permuted vector.

At an inverse permutation step 36, arbitration circuit 28 applies the inverse of the randomly-selected permutation to the permuted vector (in which all elements but one have been nulled). The resulting vector is referred to herein as "inversely-permuted vector."

At this stage, the inversely-permuted vector comprises only a single element that is set to "1". The position (i.e., element index) of this element in the vector is the index of the winning request (and thus of the winning client).

At an index identification step 37, arbitration circuit 28 identifies the index of the "1" element in the inversely-permuted vector. At a winner serving step 38, arbitration circuit 28 assigns the requested resource to the winning client.

The process of FIG. 2 is typically repeated per arbitration cycle. The number and indices of the requesting clients may change from one arbitration cycle to the next.

Random Arbiter Using Sections of Benes Networks

Figure 3:
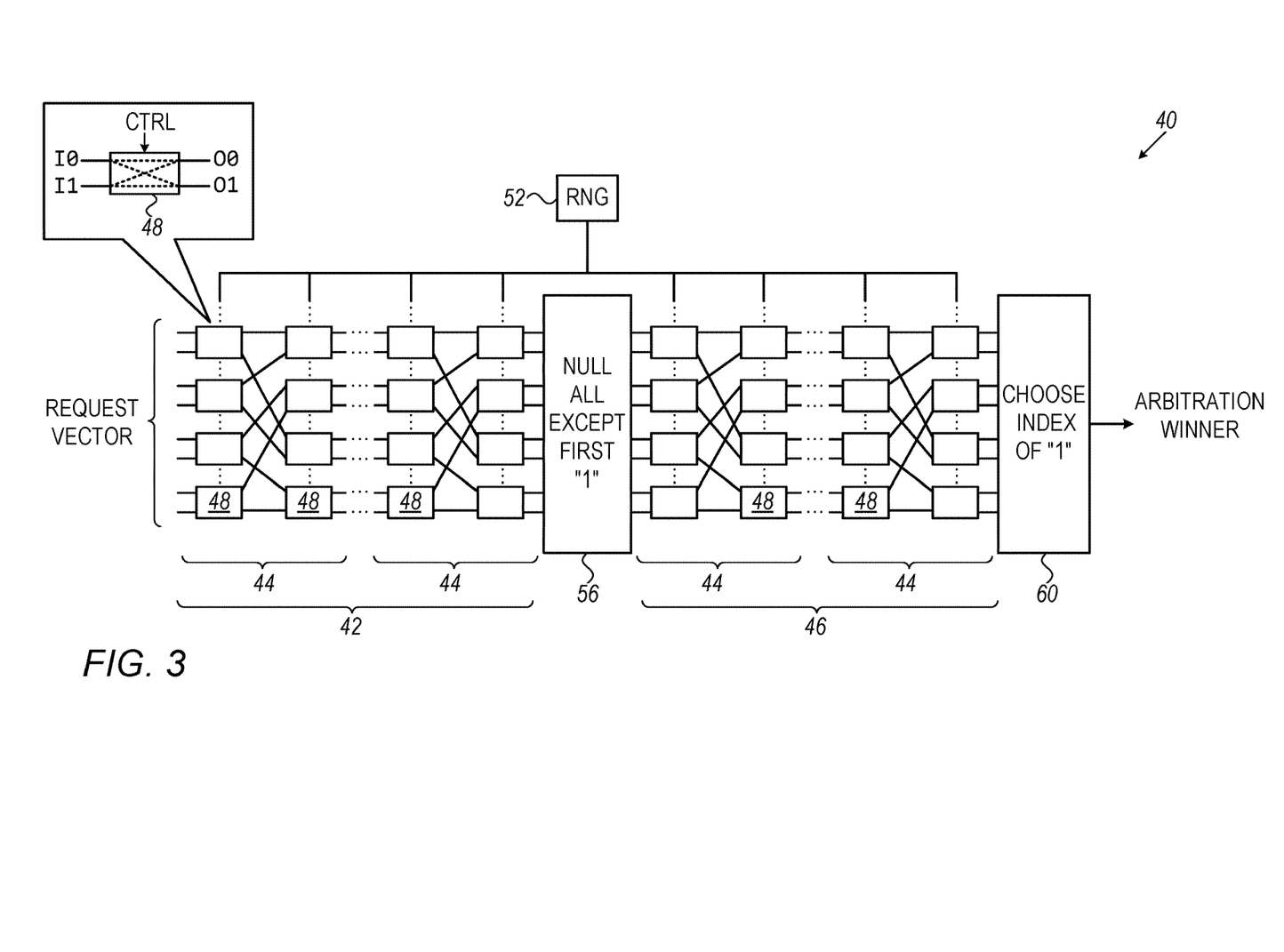
FIG. 3 is a block diagram that schematically illustrates a random arbiter using Benes networks, in accordance with an embodiment of the present invention.

FIG. 3 is a block diagram that schematically illustrates a random arbiter 40 that uses sections of Benes networks, in accordance with an embodiment of the present invention.

In the present example, the permutation circuit of arbiter 40 comprises permutation logic 42 and inverse permutation logic 46, each of which is made of a series of networks 44 connected in cascade. Each network 44 can be viewed as a first stage of a Benes network. Each network 44 comprises two sets of two-by-two cross-bar multiplexes (MUXs) 48. As can be seen in the inset at the top-left of the figure, each MUX 48 has two inputs denoted I0 and I1 and two outputs denoted O0 and O1. The MUX is controlled by a control bit denoted CTRL. Depending on the value of the control bit, the MUX either connects I0 to O0 and I1 to O1, or connects I0 to O1 and I1 to O0.

Generally, any suitable number of networks 44 can be used. Typically, however, the number of networks in each of permutation logic 42 and inverse permutation logic 46 is set to approximately $Log_2 N$, wherein N denotes the total number of clients (the size of the request vector).

Arbiter 40 further comprises an RNG 52, which generates a random control word in each arbitration cycle. Each bit of the random control word is used for randomly setting the configuration of a respective MUX 48 in permutation logic 42. Thus, permutation logic 42 receives the request vector at its input, and applies a random permutation to the request vector.

The permuted vector at the output of permutation logic 42 is provided to a nulling block 56. Block 56 nulls (i.e., sets to "0") all the elements of the permuted vector, except for the first-occurring (lowest-index) "1". The nulled vector is provided to inverse permutation logic 46.

In a given arbitration cycle, inverse permutation logic 46 is configured by the same random control word that configures permutation logic 42. The latter configuration, however, is such that logic 46 applies the inverse of the permutation applied by logic 42. The resulting vector is provided to a winner selection block 60. Block 60 identifies the single element of the vector that is not nulled (i.e., set to "1"), and outputs the index (element number) of this element as the arbitration winner. The requested resource is served to this client.

One of the benefits of implementing permutation logic 42 and inverse permutation logic 46 using sections of Benes networks, is that a small number of random bits (generated by RNG 52) is sufficient. For example, simulation shows that for N=128 ($log_2 N=7$), seven stages of 128×(2-to-1 MUX), which ideally require a total of 896 control bits, can be used with only twenty-four random bits and still yield good results. In an embodiment, 896 pseudo-random bits are derived from the twenty-four random bits, and used to control the respective 7×128=896 MUXs.

In one implementation, the pseudo-random bits, are derived as powers of the random bits, e.g.:

ctrl[0]=r[0]^r[4]
Ctrl[1]=r[2]^r[5]^r[20]
. . .
Ctrl[895]=r[18]^r[15], wherein r[0] . . . r[23] denote the random bits generated by the RNG, and ctrl[0] . . . ctrl[895] denote the 896 pseudo-random bits derived from the random bits.

In an embodiment, arbiter 40 comprises a Linear Feedback Shift Register (LFSR—not shown in the figure) that derives the (large number of) pseudo-random bits from the (small number of) random bits. In the above example, the LFSR is of degree 24. Such an LFSR is capable of producing up to $2^{24}$ pseudo-random bits, which is far greater than the 896 bits required.

Note that ideally, permutation circuit 42 is capable of generating $2^{896}$ permutations using the 896 control bits. When using only twenty-four random bits, circuit 42 generates only $2^{24}$ random permutations, which is a small fraction of the maximum possible number. Nevertheless, simulation has shown that $2^{24}$=16 M permutations is sufficient in practice to create an almost-random distribution of the outputs.

The arbiter configuration of FIG. 3 is an example configuration that is chosen purely for the sake of conceptual clarity. In alternative embodiments, any other suitable configuration can be used. For example, in the embodiment of FIG. 3 each network 44 has eight inputs and eight outputs. Arbiter 40 thus handles at most a total of eight clients. In alternative embodiments, arbiter 40 can be constructed in a similar manner to support any desired number of clients.

As another example, permutation logic 42 and inverse permutation logic 46 may comprise any suitable number of networks 44, or even a single network. The total possible number of permutations, from which a permutation is chosen at random per arbitration cycle, grows with the number of networks 44.

As yet another example, networks 44 need not necessarily be implemented using two-by-two cross-bar multiplexes, and may be implemented using other suitable types of multiplexers, or any other suitable hardware elements. As still another example, permutation logic 42 and inverse permutation logic 46 may be implemented using other network topologies, e.g., clos, and not necessarily using Benes networks.

Random Arbiter Using Scalable Permutation Blocks

Figure 4:
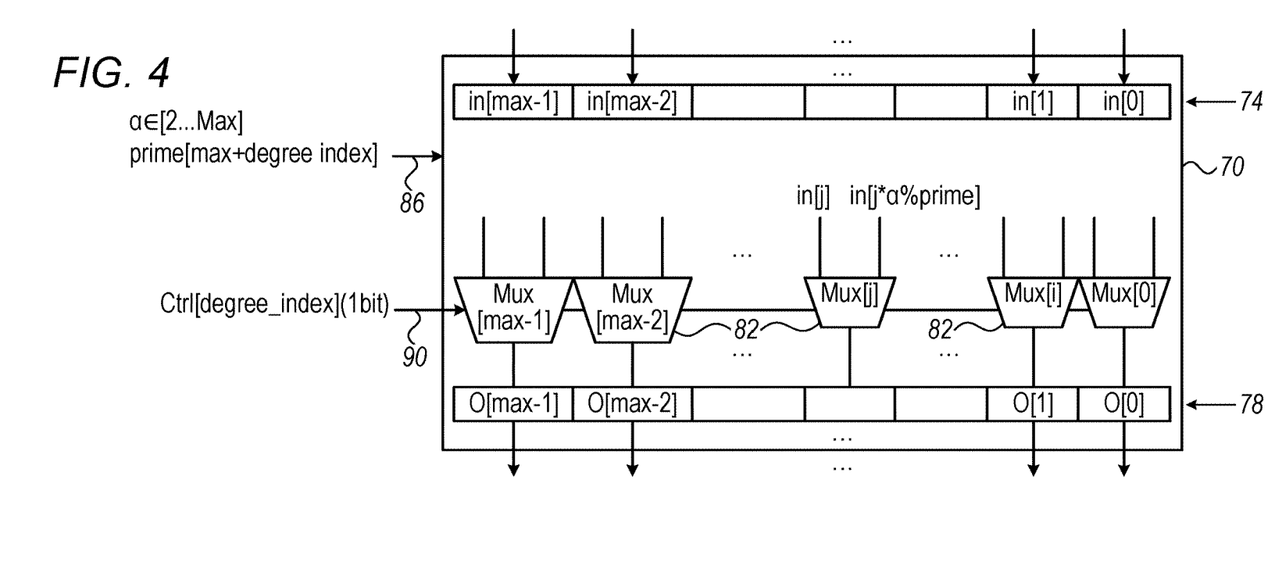
FIG. 4 is a block diagram that schematically illustrates a Single-Permutation Generator (SPG) used as a building block in a scalable permutation circuit, in accordance with an embodiment of the present invention.
Figure 5:
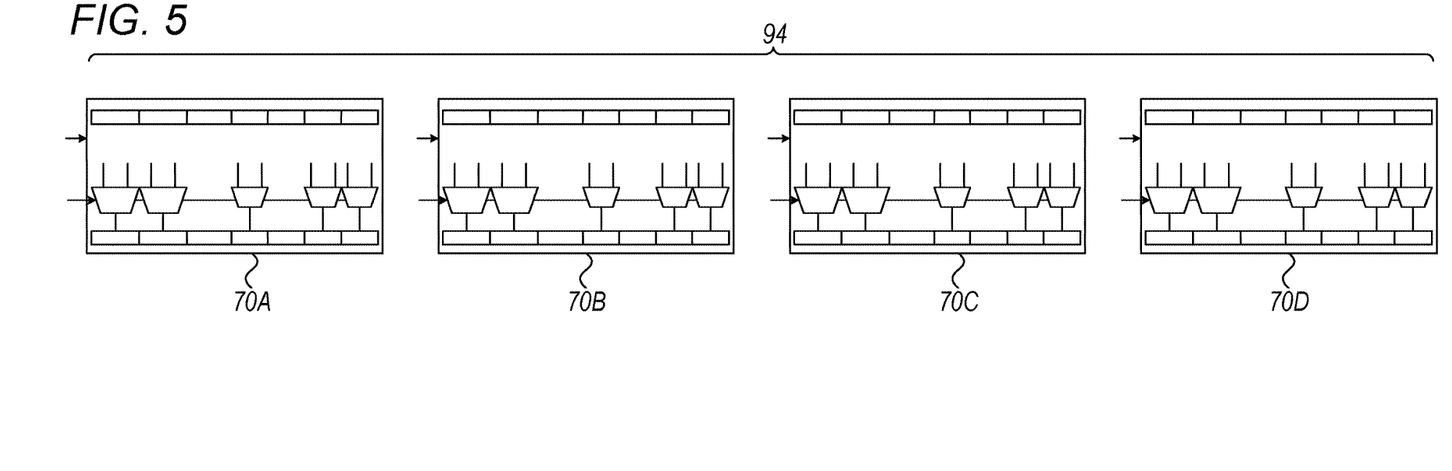
FIG. 5 is a block diagram that schematically illustrates a Single-Degree Permutation Generator (SDPG) made of a set of SPGs, in accordance with an embodiment of the present invention.
Figure 6:
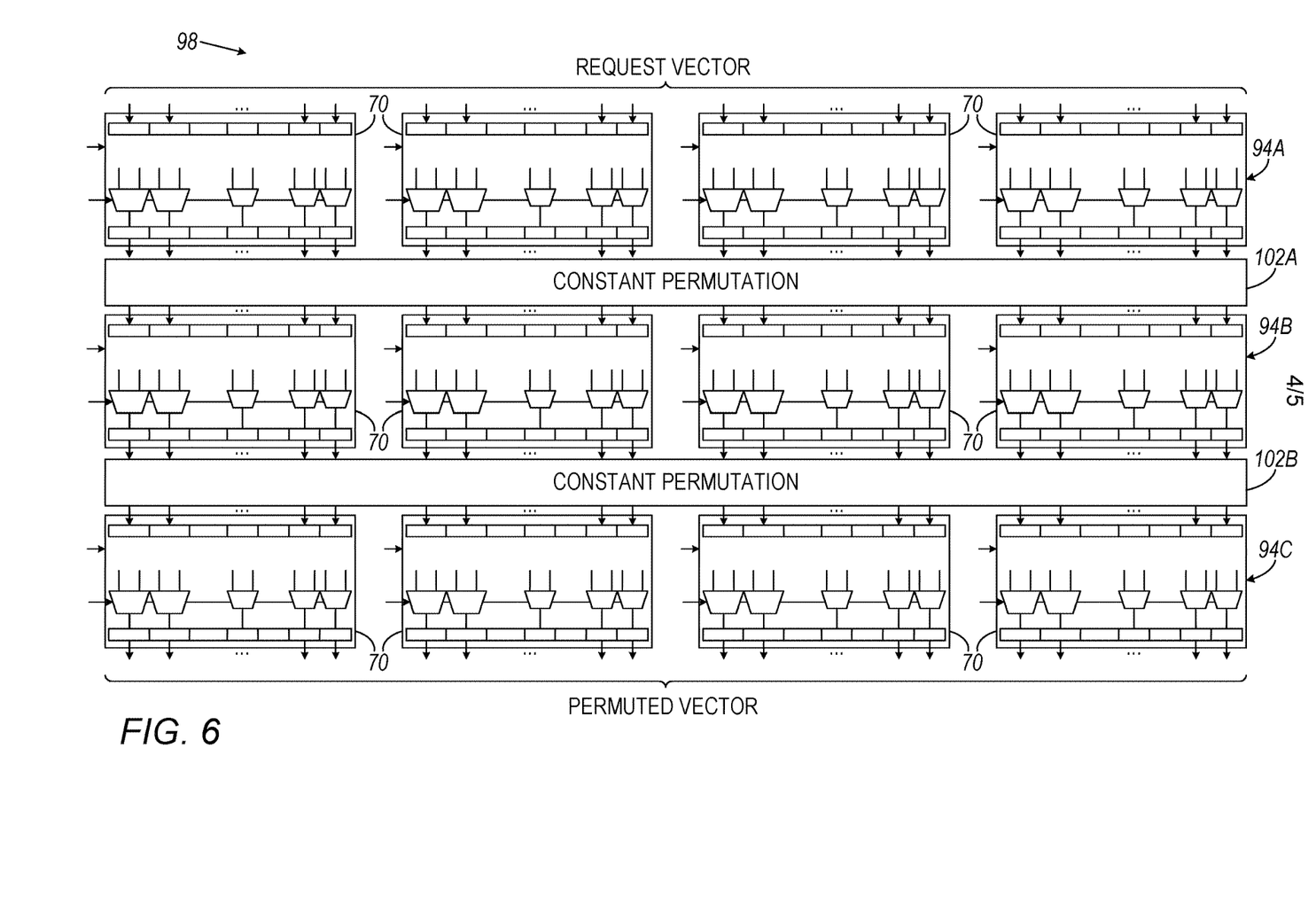
FIG. 6 is a block diagram that schematically illustrates a permutation circuit comprising multiple SDPGs, in accordance with an embodiment of the present invention.

FIGS. 4-6 below demonstrate an alternative way of implementing a permutation circuit, using a scalable array of MUX building blocks. The scheme of FIGS. 4-6 can be used for implementing permutation circuit 28, permutation logic 42 and/or inverse permutation logic 46, for example.

FIG. 4 is a block diagram that schematically illustrates a Single-Permutation Generator (SPG) 70 used as a building block in a scalable permutation circuit, in accordance with an embodiment of the present invention. SPG is configured to receive an input sub-vector {in[0], in[1], . . . , in[max−1]}, to conditionally apply a permutation to the input sub-vector, and to output the result as an output sub-vector {O[0], O[1], . . . , O[max−1]}, wherein max denotes the number of sub-vector elements.

SPG 70 is configured by the following control interfaces, denoted 86 and 90 in the figure:
   CTRL: A single bit that specifies whether the SPG is to apply a permutation of not. If not, the output sub-vector is equal to the input sub-vector.
   α: An integer in the range 2≤α≤max.
   PRIME: A prime integer number.

In some embodiments (as will be shown in FIG. 6 below), a permutation circuit is implemented using a plurality of SPGs 70 arranged in layers. In such embodiments, each layer has an index denoted degree_index. In some embodiments, the values of CTRL and PRIME depend on degree_index SPG 70 comprises an input register 74 for receiving the input sub-vector, an output register 78 for outputting the output sub-vector, and a set of two-to-one MUXs 82. The output of each MUX 82 is coupled to a respective bit of output register 78. Depending on the value of the CTRL bit, MUXs 82 either copy the input sub-vector to the output sub-vector without permutation, or apply a cyclic permutation that depends on α and PRIME. As can be seen in the figure, the $j^{th}$ MUX (0≤max−1) has one input connected to the $j^{th}$ element of the input sub-vector, and another input connected to element ((j·α) modulo PRIME) of the input sub-vector.

FIG. 5 is a block diagram that schematically illustrates a Single-Degree Permutation Generator (SDPG) comprising a set of SPGs 70, in accordance with an embodiment of the present invention. In the present example SDPG 94 comprises four SPGs denoted 70A . . . 70D. In alternative embodiments, however, SDPG 94 may comprise any other suitable number of SPGs 70. Each of the SPGs is similar in structure to the SPG shown in FIG. 4 above.

SDPG 94 is configured to receive an input vector of N·max elements, wherein max denotes the number of elements in each sub-vector handled by a single SPG 70, and N denotes the number of SPGs 70 in SDPG 94. SDPG 94 also receives, for each of SPG 70, the CTRL, a and PRIME values specified above. Typically, each of the N SPGs is configured independently of the other SPGs with CTRL, a and PRIME values. These values determine, for each SPG in the SDPG, whether or not the SPG will permute its input sub-vector, any if yes, with what permutation. The N output sub-vectors produced by the N SPGs are regarded jointly as an output vector of N·max elements.

FIG. 6 is a block diagram that schematically illustrates a permutation circuit 98 comprising multiple SDPGs 94, in accordance with an embodiment of the present invention. Permutation circuit 98 can be used, for example, for implementing permutation circuit 28 of FIG. 1.

As seen in the figure, permutation circuit 98 comprises multiple SDPGs 94. SDPGs 94 are arranged in layers, with a respective constant permutation block 102 placed between every pair of adjacent layers. Each SDPG in circuit 98 is similar to SDPG 94 shown in FIG. 5 above. Each constant permutation block 102 applies a predefined constant permutation to its input vector.

In the example of FIG. 5, permutation circuit 98 comprises three SDPGs 94A, 94B and 94C, a constant permutation block 102A placed between SDPGs 94A and 94B, and a constant permutation block 102B placed between SDPGs 94B and 94C. Alternatively, however, permutation circuit may comprise any other suitable number of SDPGs. Typically, the number of SDPGs 94 in circuit 98 is set to approximately $Log_2N$.

In an embodiment, circuit 98 is used for implementing permutation circuit 28 of random arbiter 20 of FIG. 1. In this implementation, the request vector (of size N·max) received by the arbiter is first permuted by SDPG 94A. This permutation is somewhat limited, because each SPG 70 in SDPG 94A is only able to permute its own sub-vector, i.e., only a quarter of the request vector. This limitation is overcome by block 102A, which applies a constant permutation across the entire N·max element vector output by SDPG 94A.

The N·max element vector produced by block 102A is again permuted by SDPG 94B. The N·max element vector produced by block SDPG 94B is then permuted by block 102B. Finally, the N·max element vector produced by block 102B is permuted by SDPG 94C. The output of SDPG 94C is provided as output of the entire permutation circuit.

In an example embodiment, each block 102 is implemented using the same circuitry as SPD 70, but with size N·max instead of max, and with predefined fixed values of CTRL, α and PRIME. During synthesis, this implementation is typically replaced with hard-wired connections instead of multiplexers, resulting in small footprint. Alternatively, any other suitable implementation that performs a constant permutation can be used.

As can be seen in FIGS. 4-6, the disclosed permutation circuits are highly scalable. For example, in any of SPDs 70, SDPGs 94, and/or blocks 102, the number of multiplexers grows only linearly with N (the size of the request vector or the total number of clients). In permutation circuit 98 as a whole, the number of multiplexers grows only on the order of $N \log_2 N$. In other words, the number of multiplexers in (and thus the total area of) circuit 98 is a function of $N \log_2 N$.

This property makes the disclosed scheme highly suitable for use in applications having large numbers of clients. In contrast, general permutation circuitry grows in size as a function of the number of clients squared. The difference has a dramatic impact of circuit size. For example, for N=512, permutation circuit 98 has on the order of 4608 multiplexers, as opposed to 262,144 multiplexers needed in general permutation generation.

Example Applications and Use-Cases

As noted above, the disclosed arbitration schemes and hardware configurations are applicable in a wide variety of applications and use-cases. One example application is in a network element such as a network switch.

FIG. 7 is a block diagram that schematically illustrates network switch 110, in accordance with an embodiment of the present invention. Switch 110 comprises multiple network interfaces 114, also referred to as ports, which transmit and receive communication packets to and from a communication network. Switch 110 further comprises packet processing hardware 118, which performs packet processing tasks such as classification, filtering, forwarding and the like.

In this example, ports 114 are regarded as client, and packet processing hardware 118 is regarded as the resource that is accessed by the ports. A random arbiter 122 receives requests from the various ports 114 for access to hardware 118, and arbitrates the requests using the techniques described herein. Random arbiter 122 may be implemented using any of the configurations described above.

The configurations of random arbiters 20 and 40, and their components, shown in FIGS. 1 and 3-6 above, as well as switch 110 of FIG. 7, are example configurations that are chosen purely for the sake of conceptual clarity. In alternative embodiments, any other suitable configurations can be used. The elements of the switch, the random arbiters and their components may be implemented in hardware, e.g., in one or more Application-Specific Integrated Circuits (ASICs) or Field-Programmable Gate Arrays (FPGAs). Additionally or alternatively, some random arbiter elements can be implemented using software, or using a combination of hardware and software elements.

In some embodiments, some of the functions of random arbiter 20 or 40 may be carried out by a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Although the embodiments described herein mainly address packet switching applications, the methods and systems described herein can also be used in other applications, such as in job scheduling.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An electronic apparatus, comprising:
a permutation circuit, configured to apply to an input vector a permutation selected from a plurality of predefined permutations in response to a control word; and
an arbitration circuit, configured to:
  receive a vector of requests for a resource;
  instruct the permutation circuit to apply a randomly-selected permutation to the vector of requests, by configuring the permutation circuit with a corresponding randomly-selected control word, so as to produce a permuted vector;
  select an element of the permuted vector;
  apply to the permuted vector an inverse of the randomly-selected permutation, so as to produce an inversely-permuted vector;
  identify an element of the inversely-permuted vector to which the selected element of the permuted vector is mapped; and
  assign the resource to a client corresponding to the identified element of the inversely-permuted vector,
wherein the permutation circuit comprises a plurality of single-permutation blocks, each single-permutation block controlled by a respective bit of the control word that determines whether the single-permutation block applies a fixed respective permutation or applies no permutation.

2. The apparatus according to claim 1, wherein the permutation circuit comprises a plurality of multiplexers, which are connected in a predefined topology and are configured by the control word.

3. The apparatus according to claim 1, wherein the permutation circuit comprises a plurality of two-by-two cross-bar multiplexers connected to form one or more sections of Benes networks.

4. The apparatus according to claim 1, wherein the single-permutation blocks are arranged in multiple layers, each layer comprising two or more single-permutation blocks that are configured to permute two or more respective sub-vectors, and comprising one or more constant-permutation blocks that are configured to apply a fixed permutation between the layers.

5. The apparatus according to claim 1, wherein the arbitration circuit is configured to select the element of the permuted vector, by choosing the first element in the permuted vector that indicates an active request for the resource.

6. The apparatus according to claim 1, wherein the arbitration circuit is configured to:
before applying the inverse of the randomly-selected permutation to the permuted vector, null the elements of the permuted vector other than the selected element; and
identify the element of the inversely-permuted vector to which the selected element of the permuted vector is mapped, by identifying the element of the inversely-permuted vector that is not nulled.

7. A method for arbitration, comprising:
receiving a vector of requests for a resource;
applying a randomly-selected permutation to the vector of requests, so as to produce a permuted vector;
selecting an element of the permuted vector;
applying to the permuted vector an inverse of the randomly-selected permutation, so as to produce an inversely-permuted vector;
identifying an element of the inversely-permuted vector to which the selected element of the permuted vector is mapped; and
assigning the resource to a client corresponding to the identified element of the inversely-permuted vector,
wherein applying the randomly-selected permutation comprises applying to the vector of requests a plurality of single-permutation blocks, each single-permutation block controlled by a respective bit of a randomly-selected control word that determines whether the single-permutation block applies a fixed respective permutation or applies no permutation.

8. The method according to claim 7, wherein applying the randomly-selected permutation comprises applying to the vector of requests a plurality of multiplexers, which are connected in a predefined topology and are configured by a randomly-selected control word.

9. The method according to claim 7, wherein applying the randomly-selected permutation comprises applying to the vector of requests a plurality of two-by-two cross-bar multiplexers connected to form one or more sections of Benes networks.

10. The method according to claim 7, wherein the single-permutation blocks are arranged in multiple layers, each layer comprising two or more single-permutation blocks that are configured to permute two or more respective sub-vectors, and further comprising applying a fixed permutation between the layers.

11. The method according to claim 7, wherein selecting the element of the permuted vector comprises choosing the first element in the permuted vector that indicates an active request for the resource.

12. The method according to claim 7, and comprising nulling the elements of the permuted vector other than the selected element before applying the inverse of the randomly-selected permutation to the permuted vector, wherein identifying the element of the inversely-permuted vector to which the selected element of the permuted vector is mapped comprises identifying the element of the inversely-permuted vector that is not nulled.

13. An electronic apparatus, comprising:
a permutation circuit, configured to apply to an input vector a permutation selected from a plurality of predefined permutations in response to a control word; and
an arbitration circuit, configured to:
receive a vector of requests for a resource;
instruct the permutation circuit to apply a randomly-selected permutation to the vector of requests, by configuring the permutation circuit with a corresponding randomly-selected control word, so as to produce a permuted vector;
select an element of the permuted vector;
apply to the permuted vector an inverse of the randomly-selected permutation, so as to produce an inversely-permuted vector;
identify an element of the inversely-permuted vector to which the selected element of the permuted vector is mapped; and
assign the resource to a client corresponding to the identified element of the inversely-permuted vector,
wherein the arbitration circuit is configured to:
before applying the inverse of the randomly-selected permutation to the permuted vector, null the elements of the permuted vector other than the selected element; and
identify the element of the inversely-permuted vector to which the selected element of the permuted vector is mapped, by identifying the element of the inversely-permuted vector that is not nulled.

14. The apparatus according to claim 13, wherein the permutation circuit comprises a plurality of multiplexers, which are connected in a predefined topology and are configured by the control word.

15. The apparatus according to claim 13, wherein the permutation circuit comprises a plurality of two-by-two cross-bar multiplexers connected to form one or more sections of Benes networks.

16. The apparatus according to claim 13, wherein the permutation circuit comprises a plurality of single-permutation blocks, each single-permutation block controlled by a respective bit of the control word that determines whether the single-permutation block applies a fixed respective permutation or applies no permutation.

17. The apparatus according to claim 16, wherein the single-permutation blocks are arranged in multiple layers, each layer comprising two or more single-permutation blocks that are configured to permute two or more respective sub-vectors, and comprising one or more constant-permutation blocks that are configured to apply a fixed permutation between the layers.

18. The apparatus according to claim 13, wherein the arbitration circuit is configured to select the element of the permuted vector, by choosing the first element in the permuted vector that indicates an active request for the resource.

19. A method for arbitration, comprising:
receiving a vector of requests for a resource;
applying a randomly-selected permutation to the vector of requests, so as to produce a permuted vector;
selecting an element of the permuted vector;
applying to the permuted vector an inverse of the randomly-selected permutation, so as to produce an inversely-permuted vector;
identifying an element of the inversely-permuted vector to which the selected element of the permuted vector is mapped;
assigning the resource to a client corresponding to the identified element of the inversely-permuted vector; and
nulling the elements of the permuted vector other than the selected element before applying the inverse of the randomly-selected permutation to the permuted vector, wherein identifying the element of the inversely-permuted vector to which the selected element of the permuted vector is mapped comprises identifying the element of the inversely-permuted vector that is not nulled.

* * * * *